(12) United States Patent
Varma et al.

(10) Patent No.: US 9,377,841 B2
(45) Date of Patent: *Jun. 28, 2016

(54) ADAPTIVELY LIMITING A MAXIMUM OPERATING FREQUENCY IN A MULTICORE PROCESSOR

(71) Applicant: Intel Corporation, Santa Clara, CA (US)

(72) Inventors: Ankush Varma, Hillsboro, OR (US); Ian Steiner, Hillsboro, OR (US); Avinash Ananthakrishnan, Portland, OR (US); Krishnakanth Sistla, Beaverton, OR (US); Chris Poirier, Fort Collins, CO (US); Matthew Bace, North Andover, MA (US); Eric Dehaemer, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 298 days.

This patent is subject to a terminal disclaimer.

(21) Appl. No.: 13/889,785

(22) Filed: May 8, 2013

(65) Prior Publication Data

US 2014/0337646 A1 Nov. 13, 2014

(51) Int. Cl.
   *G06F 1/32* (2006.01)

(52) U.S. Cl.
   CPC .............. *G06F 1/324* (2013.01); *G06F 1/3206* (2013.01); *Y02B 60/1217* (2013.01)

(58) Field of Classification Search
   CPC .... G06F 1/3206; G06F 1/324; Y02B 60/1217
   See application file for complete search history.

(56) References Cited

U.S. PATENT DOCUMENTS

| | | | |
|---|---|---|---|
| 5,163,153 | A | 11/1992 | Cole et al. |
| 5,522,087 | A | 5/1996 | Hsiang |
| 5,590,341 | A | 12/1996 | Matter |
| 5,621,250 | A | 4/1997 | Kim |
| 5,931,950 | A | 8/1999 | Hsu |
| 6,748,546 | B1 | 6/2004 | Mirov et al. |
| 6,792,392 | B1 | 9/2004 | Knight |
| 6,823,516 | B1 | 11/2004 | Cooper |
| 6,829,713 | B2 | 12/2004 | Cooper et al. |
| 6,996,728 | B2 | 2/2006 | Singh |

(Continued)

FOREIGN PATENT DOCUMENTS

EP   1 282 030 A1   5/2003

OTHER PUBLICATIONS

Intel Developer Forum, IDF2010, Opher Kahn, et al., "Intel Next Generation Microarchitecture Codename Sandy Bridge: New Processor Innovations," Sep. 13, 2010, 58 pages.

(Continued)

*Primary Examiner* — Thuan Du
(74) *Attorney, Agent, or Firm* — Trop, Pruner & Hu, P.C.

(57) ABSTRACT

In an embodiment, a processor includes a plurality of cores each to independently execute instructions, and a power control unit coupled to the plurality of cores to control power consumption of the processor, where the power control unit includes a control logic to reduce a maximum operating frequency of the processor if a first number of forced performance state transitions occurs in a first time period or a second number of forced performance state transitions occurs in a second time period. Other embodiments are described and claimed.

20 Claims, 7 Drawing Sheets

(56) References Cited

U.S. PATENT DOCUMENTS

| | | | |
|---|---|---|---|
| 7,010,708 | B2 | 3/2006 | Ma |
| 7,043,649 | B2 | 5/2006 | Terrell |
| 7,093,147 | B2 | 8/2006 | Farkas et al. |
| 7,111,179 | B1 | 9/2006 | Girson et al. |
| 7,194,643 | B2 | 3/2007 | Gonzalez et al. |
| 7,272,730 | B1 | 9/2007 | Acquaviva et al. |
| 7,412,615 | B2 | 8/2008 | Yokota et al. |
| 7,434,073 | B2 | 10/2008 | Magklis |
| 7,437,270 | B2 | 10/2008 | Song et al. |
| 7,454,632 | B2 | 11/2008 | Kardach et al. |
| 7,529,956 | B2 | 5/2009 | Stufflebeam |
| 7,539,885 | B2 | 5/2009 | Ma |
| 7,730,340 | B2 | 6/2010 | Hu et al. |
| 8,296,773 | B2 * | 10/2012 | Bose et al. ............. 718/105 |
| 8,943,340 | B2 * | 1/2015 | Ananthakrishnan ...... G06F 1/26 713/320 |
| 2001/0044909 | A1 | 11/2001 | Oh et al. |
| 2002/0194509 | A1 | 12/2002 | Plante et al. |
| 2003/0061383 | A1 | 3/2003 | Zilka |
| 2004/0064752 | A1 | 4/2004 | Kazachinsky et al. |
| 2004/0098560 | A1 | 5/2004 | Storvik et al. |
| 2004/0139356 | A1 | 7/2004 | Ma |
| 2004/0268166 | A1 | 12/2004 | Farkas et al. |
| 2005/0022038 | A1 | 1/2005 | Kaushik et al. |
| 2005/0033881 | A1 | 2/2005 | Yao |
| 2005/0132238 | A1 | 6/2005 | Nanja |
| 2006/0050670 | A1 | 3/2006 | Hillyard et al. |
| 2006/0053326 | A1 | 3/2006 | Naveh |
| 2006/0059286 | A1 | 3/2006 | Bertone et al. |
| 2006/0069936 | A1 | 3/2006 | Lint et al. |
| 2006/0117202 | A1 | 6/2006 | Magklis et al. |
| 2006/0184287 | A1 | 8/2006 | Belady et al. |
| 2007/0005995 | A1 | 1/2007 | Kardach et al. |
| 2007/0016817 | A1 | 1/2007 | Albonesi et al. |
| 2007/0079294 | A1 | 4/2007 | Knight |
| 2007/0106827 | A1 | 5/2007 | Boatright et al. |
| 2007/0156992 | A1 | 7/2007 | Jahagirdar |
| 2007/0214342 | A1 | 9/2007 | Newburn |
| 2007/0239398 | A1 | 10/2007 | Song et al. |
| 2007/0245163 | A1 | 10/2007 | Lu et al. |
| 2008/0005592 | A1 | 1/2008 | Allarey et al. |
| 2008/0028240 | A1 | 1/2008 | Arai et al. |
| 2008/0250260 | A1 | 10/2008 | Tomita |
| 2009/0006871 | A1 | 1/2009 | Liu et al. |
| 2009/0132844 | A1 | 5/2009 | Allarey et al. |
| 2009/0150695 | A1 | 6/2009 | Song et al. |
| 2009/0150696 | A1 | 6/2009 | Song et al. |
| 2009/0158061 | A1 | 6/2009 | Schmitz et al. |
| 2009/0158067 | A1 | 6/2009 | Bodas et al. |
| 2009/0172375 | A1 | 7/2009 | Rotem et al. |
| 2009/0172428 | A1 | 7/2009 | Lee |
| 2009/0235105 | A1 | 9/2009 | Branover et al. |
| 2009/0235108 | A1 | 9/2009 | Gold et al. |
| 2010/0115309 | A1 | 5/2010 | Carvalho et al. |
| 2010/0146513 | A1 | 6/2010 | Song |
| 2010/0191997 | A1 | 7/2010 | Dodeja et al. |
| 2011/0154090 | A1 | 6/2011 | Dixon et al. |
| 2011/0258477 | A1 * | 10/2011 | Baker et al. ............. 713/600 |
| 2012/0079290 | A1 | 3/2012 | Kumar |
| 2012/0246506 | A1 | 9/2012 | Knight |
| 2012/0324248 | A1 * | 12/2012 | Schluessler et al. .......... 713/300 |
| 2012/0331310 | A1 * | 12/2012 | Burns et al. ............. 713/300 |
| 2013/0111226 | A1 | 5/2013 | Ananthakrishnan et al. |

OTHER PUBLICATIONS

SPEC—Power and Performance, Design Overview V1.10, Standard Performance Information Corp., Oct. 21, 2008, 6 pages.

Intel Technology Journal, "Power and Thermal Management in the Intel Core Duo Processor," May 15, 2006, pp. 109-122.

Anoop Iyer, et al., "Power and Performance Evaluation of Globally Asynchronous Locally Synchronous Processors," 2002, pp. 1-11.

Greg Semeraro, et al., "Hiding Synchronization Delays in A GALS Processor Microarchitecture," 2004, pp. 1-13.

Joan-Manuel Parcerisa, et al., "Efficient Interconnects for Clustered Microarchitectures," 2002, pp. 1-10.

Grigorios Magklis, et al., "Profile-Based Dynamic Voltage and Frequency Scaling for a Multiple Clock Domain Microprocessor," 2003, pp. 1-12.

Greg Semeraro, et al., "Dynamic Frequency and Voltage Control for a Multiple Clock Domain Architecture," 2002, pp. 1-12.

Greg Semeraro, "Energy-Efficient Processor Design Using Multiple Clock Domains with Dynamic Voltage and Frequency Scaling," 2002, pp. 29-40.

Diana Marculescu, "Application Adaptive Energy Efficient Clustered Architectures," 2004, pp. 344-349.

L. Benini, et al., "System-Level Dynamic Power Management," 1999, pp. 23-31.

Ravindra Jejurikar, et al., "Leakage Aware Dynamic Voltage Scaling for Real-Time Embedded Systems," 2004, pp. 275-280.

Ravindra Jejurikar, et al., "Dynamic Slack Reclamation With Procrastination Scheduling in Real-Time Embedded Systems," 2005, pp. 13-17.

R. Todling, et al., "Some Strategies for Kalman Filtering and Smoothing," 1996, pp. 1-21.

R.E. Kalman, "A New Approach to Linear Filtering and Prediction Problems," 1960, pp. 1-12.

International Application No. PCT/US2012/028865, filed Mar. 13, 2012, entitled "Providing Efficient Turbo Operation of a Processor," by Intel Corporation.

International Application No. PCT/US2012/028902, filed Mar. 13, 2012, entitled "Dynamically Controlling Interconnect Frequency in a Processor," by Intel Corporation.

International Application No. PCT/US2012/028876, filed Mar. 13, 2012, entitled "Dynamically Computing an Electrical Design Point (EDP) for a Multicore Processor," by Intel Corporation.

U.S. Appl. No. 13/247,564, filed Sep. 28, 2011, entitled, "Estimating Temperature of a Processor Core in a Low Power State", by Avinash N. Ananthakrishnan, et al.

U.S. Appl. No. 13/282,896, filed Oct. 27, 2011, entitled, "Enabling a Non-Core Domain to Control Memory Bandwidth ", by Avinash N. Ananthakrishnan, et al.

U.S. Appl. No. 13/282,947, filed Oct. 27, 2011, entitled, "Controlling Operating Frequency of a Core Domain Via a Non-Core Domain of a Multi-Domain Processor", by Avinash N. Ananthakrishnan, et al.

U.S. Appl. No. 13/285,414, filed Oct. 31, 2011, entitled, "Controlling a Turbo Mode Frequency of a Processor," by Avinash N. Ananthakrishnan, et al.

U.S. Appl. No. 13/247,580, filed Sep. 28, 2011, entitled, "Controlling Temperature of Multiple Domains of a Multi-Domain Processor," by Avinash N. Ananthakrishnan, et al.

U.S. Appl. No. 13/285,465, filed Oct. 31, 2011, entitled, "Dynamically Controlling Cache Size to Maximize Energy Efficiency," by Avinash N. Ananthakrishnan, et al.

U.S. Appl. No. 13/225,677, filed Sep. 6, 2011, entitled, "Dynamically Allocating a Power Budget Over Multiple Domains of a Processor," by Avinash N. Ananthakrishnan, et al.

U.S. Appl. No. 13/600,568, filed Aug. 31, 2012, entitled, "Configuring Power Management Functionality in a Processor," by Malini K. Bhandaru, et al.

International Application No. PCT/US2012/067202, filed Nov. 30, 2012, entitled "Enforcing a Power Consumption Duty Cycle in a Processor," by Intel Corporation.

European Patent Office, Extended European Search Report mailed Jul. 7, 2015, in European Patent Application No. 14166917.6.

* cited by examiner

350

ADAPTIVELY LIMITING A MAXIMUM OPERATING FREQUENCY IN A MULTICORE PROCESSOR

FIELD OF INVENTION

Embodiments relate to power management of a system, and more particularly to power management of a multicore processor.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

Power management for an integrated circuit such as a processor is often based on pre-computed values that seek to limit power consumption based on various tradeoffs. To this end, a processor can be configured to operate at various power and performance states. At least some of these performance states may exceed a guaranteed operating frequency and operating voltage for one or more cores when electrical and other constraints are met. Typically a processor includes an electrical design point (EDP) that provides a worst case power/current consumption level that preemptively prevents violation of such constraints. In addition, a processor may be configured with hard limits on a maximum frequency permitted for each number of active cores. Yet performance losses can occur at such levels as cores of a multicore processor routinely enter into and exit from low power states.

DETAILED DESCRIPTION

In various embodiments, a processor may be dynamically controlled to limit a maximum operating frequency at which one or more cores of a multicore processor are allowed to operate. More particularly, this maximum operating frequency, referred to herein as a ceiling frequency or turbo limit frequency, may be set at a lower value than a configured maximum operating frequency at which such one or more cores may operate. By providing this potentially lower limit on maximum operating frequency, performance loss that occurs when cores that are operating at a higher performance state are forced to incur the penalty of a performance state change (e.g., a frequency change) due to events occurring on one or more other cores can be avoided. These events may in an embodiment correspond to low power state exits of other cores that cause a forced performance state transition to ensure that various processor constraints are not reached.

Figure 1:
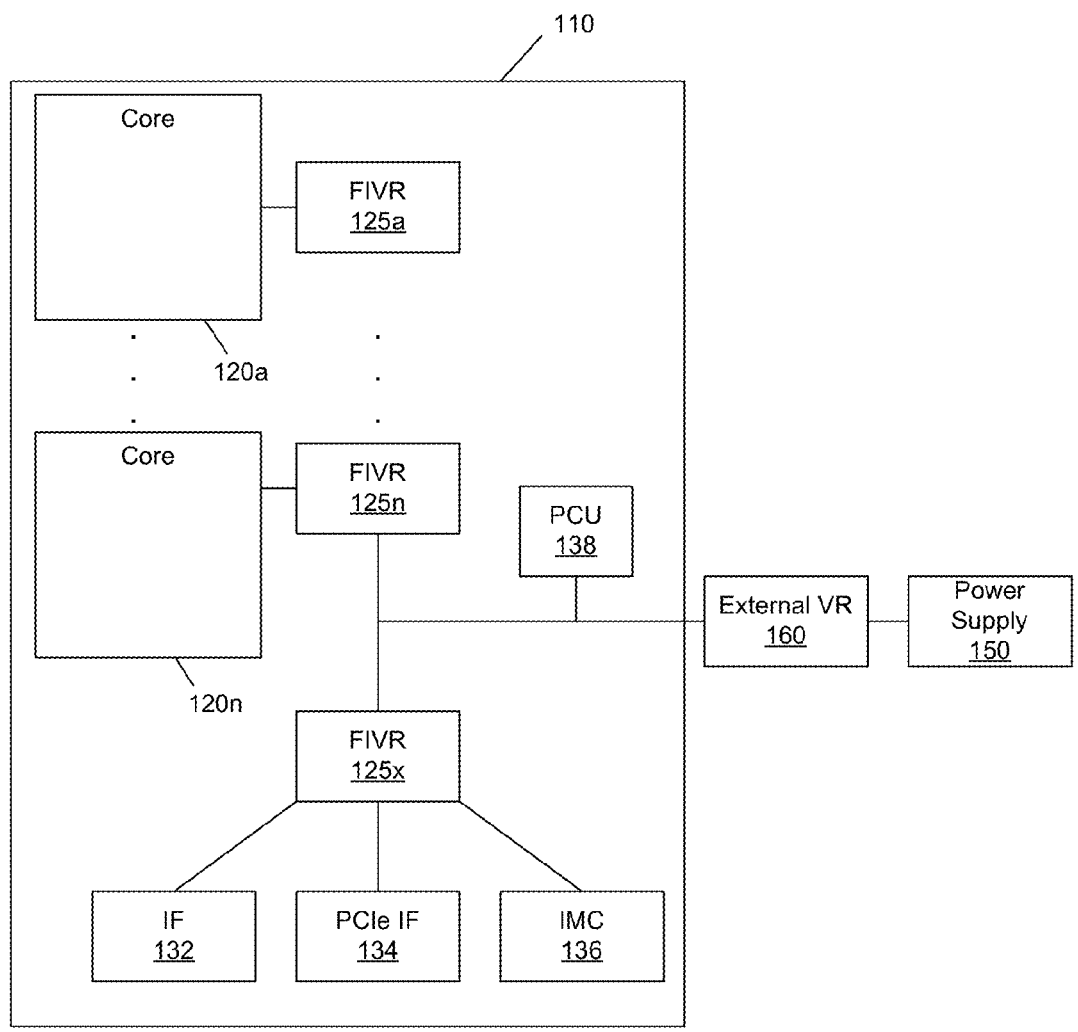
FIG. 1 is a block diagram of a system in accordance with one embodiment of the present invention.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor including multiple cores $120_a$-$120_n$. In addition, each core may be associated with an individual voltage regulator $125_a$-$125_n$. Accordingly, a fully integrated voltage regulator (FIVR) implementation may be provided to allow for fine-grained control of voltage and thus power and performance of each individual core. As such, each core can operate at an independent voltage and frequency, enabling great flexibility and affording wide opportunities for balancing power consumption with performance.

Still referring to FIG. 1, additional components may be present within the processor including an input/output interface 132, another interface 134, and an integrated memory controller 136. As seen, each of these components may be powered by another integrated voltage regulator $125_x$. In one embodiment, interface 132 may be in accordance with the Intel® Quick Path Interconnect (QPI) protocol, which provides for point-to-point (PtP) links in a cache coherent protocol that includes multiple layers including a physical layer, a link layer and a protocol layer. In turn, interface 134 may be in accordance with a Peripheral Component Interconnect Express (PCIe™) specification, e.g., the PCI Express™ Specification Base Specification version 2.0 (published Jan. 17, 2007).

Also shown is a power control unit (PCU) 138, which may include hardware, software and/or firmware to perform power management operations with regard to processor 110. In various embodiments, PCU 138 may include logic to dynamically limit a turbo mode frequency of one or more cores to a configurable or adaptive maximum ceiling value based at least in part on an analysis of a workload and a number of performance state transitions occurring in cores due to low power state exit or other events of other cores.

While not shown for ease of illustration, understand that additional components may be present within processor 110 such as uncore logic, and other components such as internal memories, e.g., one or more levels of a cache memory hierarchy and so forth. Furthermore, while shown in the implementation of FIG. 1 with an integrated voltage regulator, embodiments are not so limited.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications typically include a microcontroller, a digital signal processor (DSP), network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future, such as for power conservation and energy efficiency in products that encompass a large portion of the US economy.

Note that the adaptive core turbo limit control described herein may be independent of and complementary to an operating system (OS)-based mechanism, such as the Advanced Configuration and Platform Interface (ACPI) standard (e.g., Rev. 3.0b, published Oct. 10, 2006). According to ACPI, a processor can operate at various performance states or levels, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to ACPI, a processor can operate at various power states or levels. With regard to power states, ACPI specifies different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth). By controlling certain processor parameters as described herein, an OS-requested performance level may be limited to no greater than an adaptive ceiling value.

In general, the power consumption of each core varies based on three main factors: the workload, and the core's P-state and C-state. A higher P-state implies higher voltage, frequency, power and (usually) performance. Each core may have a different P-state, or all cores may be grouped together at the same effective P-state.

In order to guarantee electrical safety such as not exceeding a maximum current consumption level (IccMax), the processor is configured to ensure that cores operating in a turbo mode (at a turbo mode frequency) do not exceed the hard electrical constraints of the platform (especially supply voltage regulators) at any point. Two mechanisms are used independently in this regard: EDP, where the PCU uses fused worst case parameters to compute worst case power/current and pre-emptively prevent the system from entering a state where the constraints could be violated; and fused per-core turbo limits which may be implemented via a table that places hard limits on the maximum operating frequency permitted for each number of active cores. For example, a single core may be permitted to operate at turbo mode frequencies of up to 4 GHz, but 2 cores are permitted to operate at turbo mode frequencies of up to 3.5 GHz, and 3 cores are permitted to operate at turbo mode frequencies of up to 3.0 GHz etc.

During turbo mode, it is possible to suffer performance loss when some cores are requesting a turbo P-state while other cores are rapidly entering and exiting low power C-states. As an illustration, consider a 4-core processor in which two cores (core 0 and core 1) are requesting a maximum turbo mode, one core (core 2) is in a core C-state (a given low power state), and the fourth core (core 3) is entering and exiting a core C-state every 10 μs. When core 3 is in a low power C-state, EDP and per-core calculations may allow core 0 and core 1 to operate at a turbo mode frequency of 3.5 GHz. However, as soon as core 3 exits the C-state and starts running, it forces a re-evaluation of the constraints, forcing a P-state transition on core 0 and core 1, causing them to operate at a turbo mode frequency of 3.0 GHz. When core 3 enters the C-state again, the reduction in its power consumption allows core 0 and core 1 to again undergo a V/F transition back up to 3.5 GHz. This can happen several times each millisecond. Each V/F transition involves a time of at least several microseconds (μs) where the transitioning core cannot execute any instructions. As a result, frequent V/F transitions may result in a performance loss. Thus hard constraints (EDP and fused turbo limits) may result in core P-state transitions (which should be relatively infrequent events) becoming as frequent as core C-state transitions (which can occur very frequently), resulting in excessive performance loss.

Embodiments may manage a maximum ceiling turbo mode frequency using an adaptive algorithm to track the number of "forced" P-state transitions (P-state transitions that were triggered by a C-state transition causing a hard constraint to be reached), rather than performing any pre-computation. In this way, optimized performance is realized even if each core has different power characteristics (V/F curves, leakage, temperature, or even core type) because actual system behavior is tracked. In addition, the algorithm is cognizant of different cores having different P-states, while at the same time consuming minimal computational overhead, which scales well with core count. As such, embodiments are robust against core-to-core performance, power, characterization or other variations.

In the above example, if the system was able to arrive at a ceiling frequency of 3.0 GHz, then the frequent P-state transitions could be avoided. This can be done based on a tradeoff of whether the increased frequency is delivering additional performance that compensates from the performance loss from frequent P-state transitions.

Figure 2:
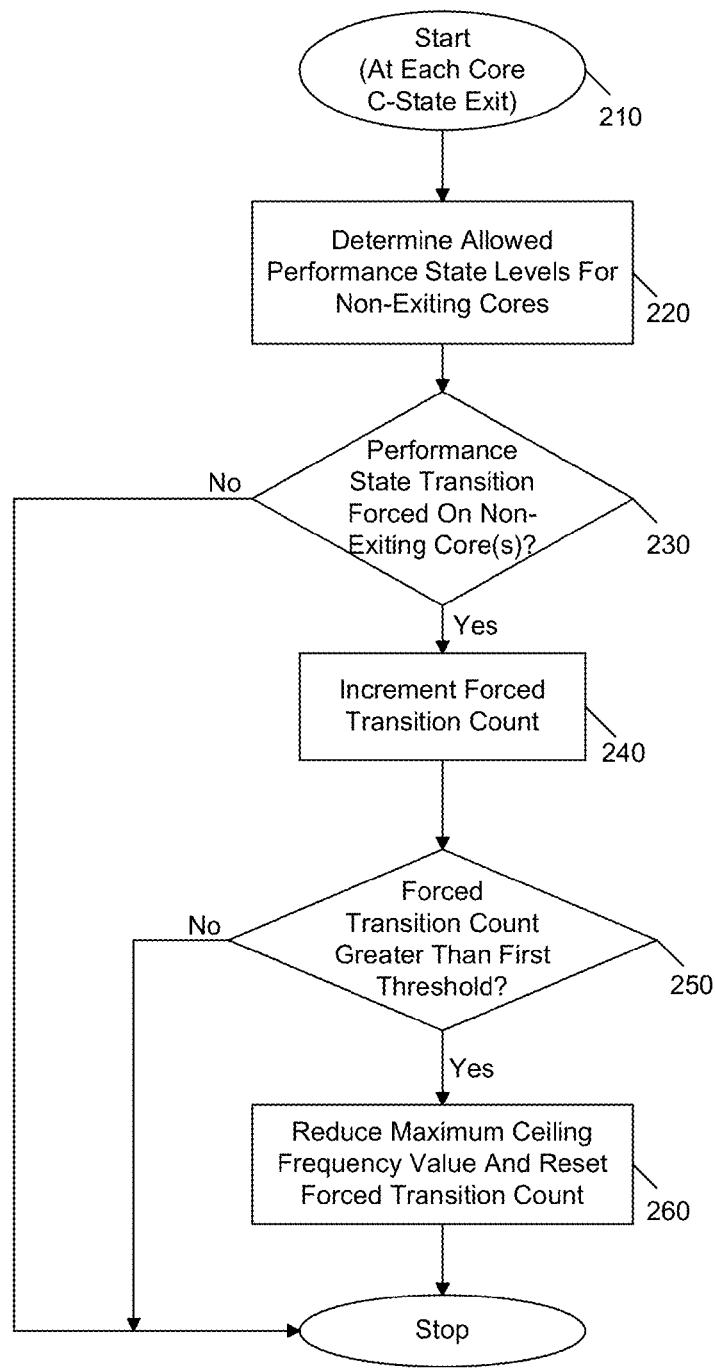
FIG. 2 is a flow diagram of a method in accordance with an embodiment of the present invention.

Referring now to FIG. 2, shown is a flow diagram of a method in accordance with an embodiment of the present invention. More specifically, method 200 shows a technique for determining whether one or more cores suffered a forced transition upon another core's exit from a low power state, and operations that occur in such event. Method 200 can be implemented by logic of a PCU. More specifically, method 200 can be implemented by an adaptive turbo limit control logic of a PCU. Note that each core has the ability to request a P-state and enter/exit one or more C-states. The PCU may supervise P-states granted to each core through hardware interaction that may involve setting various configurable settings such as of a buffer, phase locked loop or so forth, in addition to controlling a sequence of defined steps for changing P-states. In different embodiments all cores may be granted the same or different P-states As seen, method 200 begins upon an occurrence of an event at block 210. In an embodiment this event corresponds to a core exit from a low power state. In the paradigm described herein, this low power state exit may be when a given core exits a non-C0 state and enters into an active or C0 state. Note that such transitions may occur with great frequency. For example, based on software control, various cores of a multicore processor can enter into and exit from low power states tens or hundreds of times per millisecond (ms).

When a given core exits from a low power state, control passes to block 220 where the allowed performance state for each non-exiting core is determined. Operations to enforce the allowed performance states may also be performed. Relevant to this analysis are performance state transitions that reduce the performance state of these non-exiting cores to maintain operation within a given constraint. These transitions are thus forced transitions in that the performance state transition is not done responsive to that core's request but instead is forced onto the core to maintain processor operation below a given constraint. Thus such forced transitions are different than a performance state transition that is requested by the core itself, OS, or other non-power control-based logic. If a determination is made that a forced transition is to occur, power control logic of the processor may cause the transition to occur. This transition may cause the implicated core to stop performing useful work for at least a duration of time (e.g., tens of microseconds) while various changes are made to enable the core to operate at a lower performance state (e.g., lower frequency and/or voltage).

Still referring to FIG. 2, control next passes to diamond 230 to determine whether a forced performance state transition occurred to one or more cores. If no such forced transition occurred, method 200 may conclude for that iteration. If instead the forced transition occurred, control passes to block 240 where a count of forced transitions is incremented. In an embodiment, this forced transition count may be stored in a storage such as a register of the PCU, which may be incremented each time a core is forced to incur a performance state transition. Thus if 2 cores are forced to incur a transition, the forced transition count is incremented by 2. Next, control passes to diamond 250 to determine whether the forced transition count is greater than a first threshold. This first threshold may correspond to a fast loop threshold which may be indicative of a relatively large number of forced transitions occurring within a short duration that thus triggers a reduction in ceiling frequency. In an embodiment, this first threshold may be between approximately 10 and 100. More specifically, if this forced transition count exceeds the first threshold, control passes to block 260 where a maximum ceiling frequency may be reduced. In an embodiment, this reduction may be by a bin value, which in one embodiment may be 100 MHz. Still further, this count of forced transitions may be reset.

In an embodiment, this maximum ceiling frequency may be a value stored in a storage such as a configuration register of the PCU. Note that this maximum ceiling frequency may be lower than fused values for the processor. As such this maximum ceiling frequency is a limit on the maximum P-state a core can be granted, even when constraints would allow a higher frequency, in order to minimize performance impact from excessive P-state transitions. Namely a processor can include a maximum operating frequency that is fused into the processor and corresponds to an EDP limit on frequency. Furthermore, a processor may further include additional maximum configured operating frequency values that each correspond to a maximum operating frequency dependent upon a given number of active cores. In various implementations, the maximum ceiling frequency thus controlled using method 200 may be dynamically controllable to be less than any of these configured, fused operating frequencies. Note that method 210 may be considered to provide substantially instantaneous control of frequency, and thus is a fast process. The primary purpose of the fast process is to provide readings of the number of forced P-state transitions. In addition, it can also take immediate action if this number is too high (namely above the first or fast threshold), rather than having to pay a performance penalty continuously until a next iteration of a slow process. Although shown at this high level in the embodiment of FIG. 2, understand the scope of the present invention is not limited in this regard.

Figure 3:
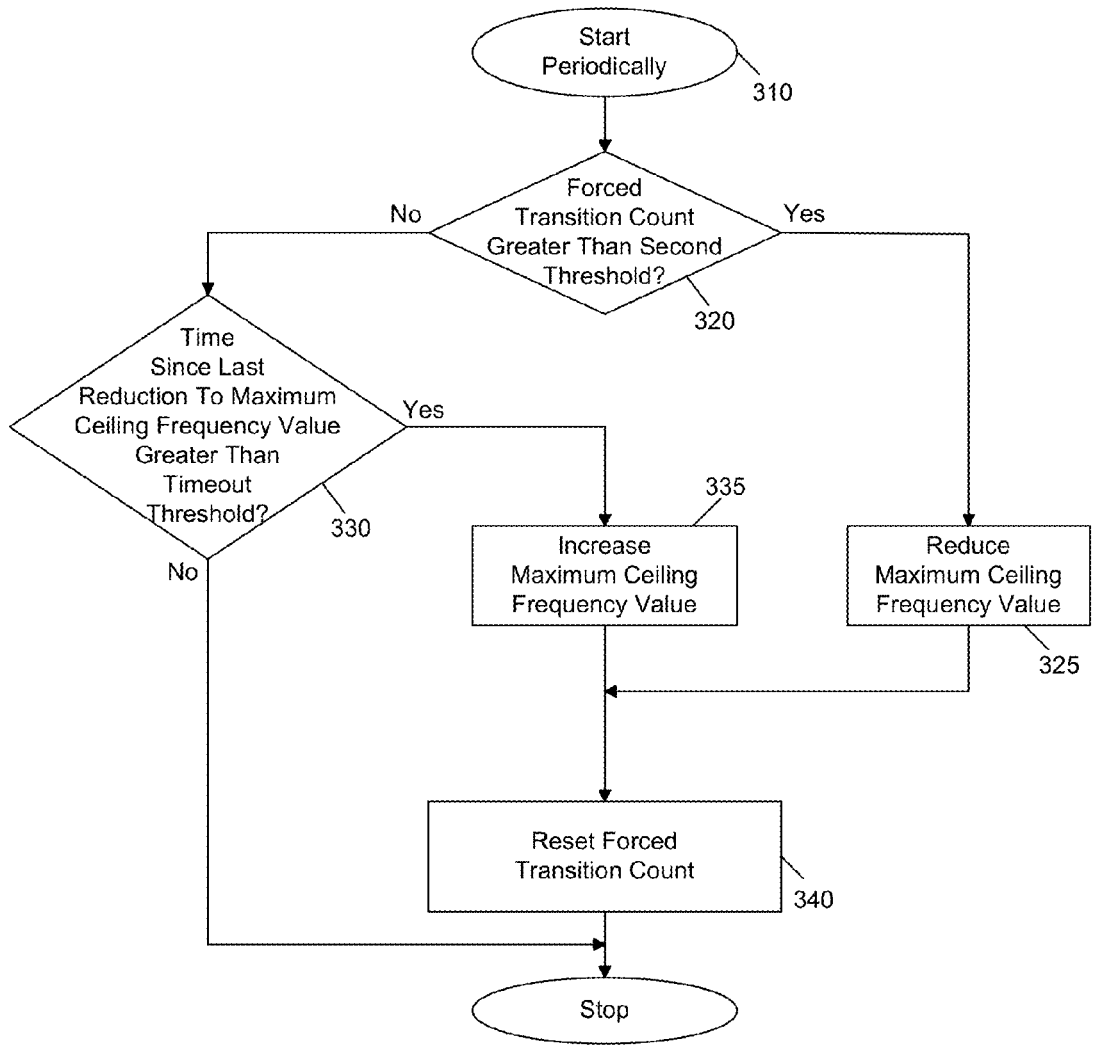
FIG. 3 is a flow diagram of a method for updating a maximum ceiling frequency in accordance with another embodiment of the present invention.

Referring now to FIG. 3, shown is a flow diagram of a method for updating a maximum ceiling frequency in accordance with another embodiment of the present invention. More specifically, method 300, which may also be performed by logic of a PCU, illustrates operations that are performed at a slower interval than the operations performed according to method 200. For example, in an embodiment the operations of FIG. 3 may be performed according to a periodic duration which in an embodiment may roughly correspond to approximately 1 ms.

As seen, method 300 begins at block 310 when triggered, e.g., pursuant to a timer time out. Next control passes to diamond 320 where it is determined whether the forced transition count is greater than a second threshold. Note that this second threshold may correspond to a slow threshold and may be set at a lower value than the first threshold. In an embodiment, this second threshold may be between approximately 5 and 100. In an embodiment, these thresholds may be tuned values that depend on various parameters including how sensitive a given workload is to frequency and other parameters. If this number of forced transitions exceeds the threshold control passes to block 325 where the maximum ceiling frequency can be reduced. In an embodiment, this decrease may be by a bin value. From there control passes to block 340 where the forced transition count can be reset.

If instead at a particular iteration of method 300 the count of forced transitions does not exceed the second threshold, control passes to diamond 330. There it can be determined whether the time since the last reduction to the maximum ceiling frequency exceeds a timeout threshold. Although the scope of the present invention is not limited in this regard in some embodiments this timeout threshold may be set approximately to a given number of iterations of method 300. For example, this timeout threshold may be set to a value of 10 milliseconds and accordingly, at least approximately 10 iterations through the loop may occur before the time since a last reduction in frequency exceeds this timeout threshold. When this occurs, control passes to block 335 where the maximum ceiling frequency may be increased. In an embodiment, this frequency increase may be by a bin value. Control then passes to block 340 as discussed above. Note that if the time since the last reduction to the maximum ceiling frequency does not exceed the timeout threshold, method 300 may conclude for that iteration. Note that method 300 may be considered to be a comparatively slow process. The primary purpose of the slow process is to adjust the maximum ceiling frequency up or down gradually as needed to maintain the number of forced P-state transitions under a given threshold. If the threshold is exceeded, the ceiling is lowered. If the threshold is not exceeded for a long time (corresponding to the timeout threshold), the ceiling can be raised. Essentially, this replaces the fast-varying maximum turbo mode frequency permitted by the constraints with a slower-moving maximum ceiling frequency value that is controlled explicitly by this policy to manage performance loss. Although shown at this high level in the embodiment of FIG. 3, understand the scope of the present invention is not limited in this regard.

Figure 4:
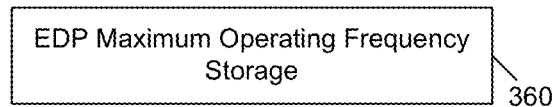
FIG. 4 is a block diagram of a storage used to store various configuration in other values used in configurable ceiling frequency control in accordance with an embodiment.
Figure 4:
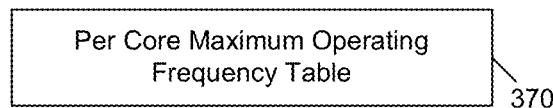
Figure 4:
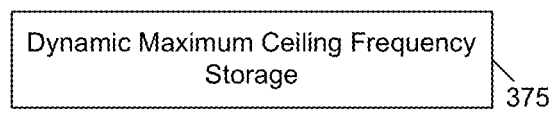
Figure 4:
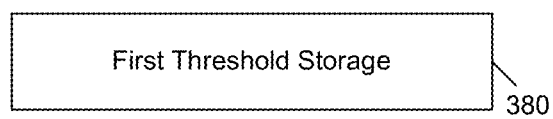
Figure 4:
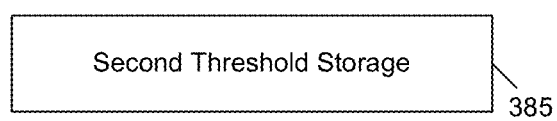
Figure 4:
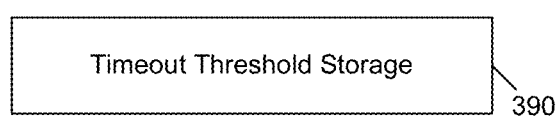

Referring now to FIG. 4, shown is a block diagram of a storage used to store various configuration and other values used in configurable ceiling frequency control in accordance with an embodiment. As seen in FIG. 4, storage 350 may be a set of registers or other storage mechanisms within a processor. As an example, storage 350 may be at least a portion of a configuration and status storage within a PCU of a processor. As such, various elements shown in FIG. 4 each may correspond to a register to store one or more values. Instead of registers, another type of storage may be present such as a memory including the plurality of entries, e.g., a cache memory such as a static random access memory (SRAM) or other types of memory.

As seen, storage 350 includes a first storage 360 to store an EDP maximum operating frequency. This maximum operating frequency is a fused value that corresponds to a maximum operating frequency that is permissible. A second storage 370 may store a table of maximum operating frequencies permissible depending upon an active number of cores. That is, the table may include multiple entries each associating a number of active cores with a maximum operating frequency. For example, when a single core of a multicore processor is active, this maximum operating frequency may match the EDP maximum operating frequency. Instead when greater numbers of cores are active, the corresponding maximum operating frequency may be lower than the EDP configured maximum operating frequency to respect EDP and other constraints.

Still referring to FIG. 4, a third storage 375 stores a dynamic ceiling frequency which in an embodiment may be a configurable value that corresponds to the maximum ceiling frequency determined in accordance with one or more of methods 200 and 300 of FIGS. 2 and 3, respectively. To perform such methods, additional configuration values including the various thresholds described may also be stored in storage 350. Thus as shown, the first and second thresholds may be stored in storages 380 and 385 respectively while the timeout threshold may be stored in storage 390. Although shown at this high level in the embodiment of FIG. 4 with these particular storage elements, understand the scope of the present invention is not limited in this regard and many other pieces of information may be included in these and other storages within the PCU or other processor.

Figure 5:
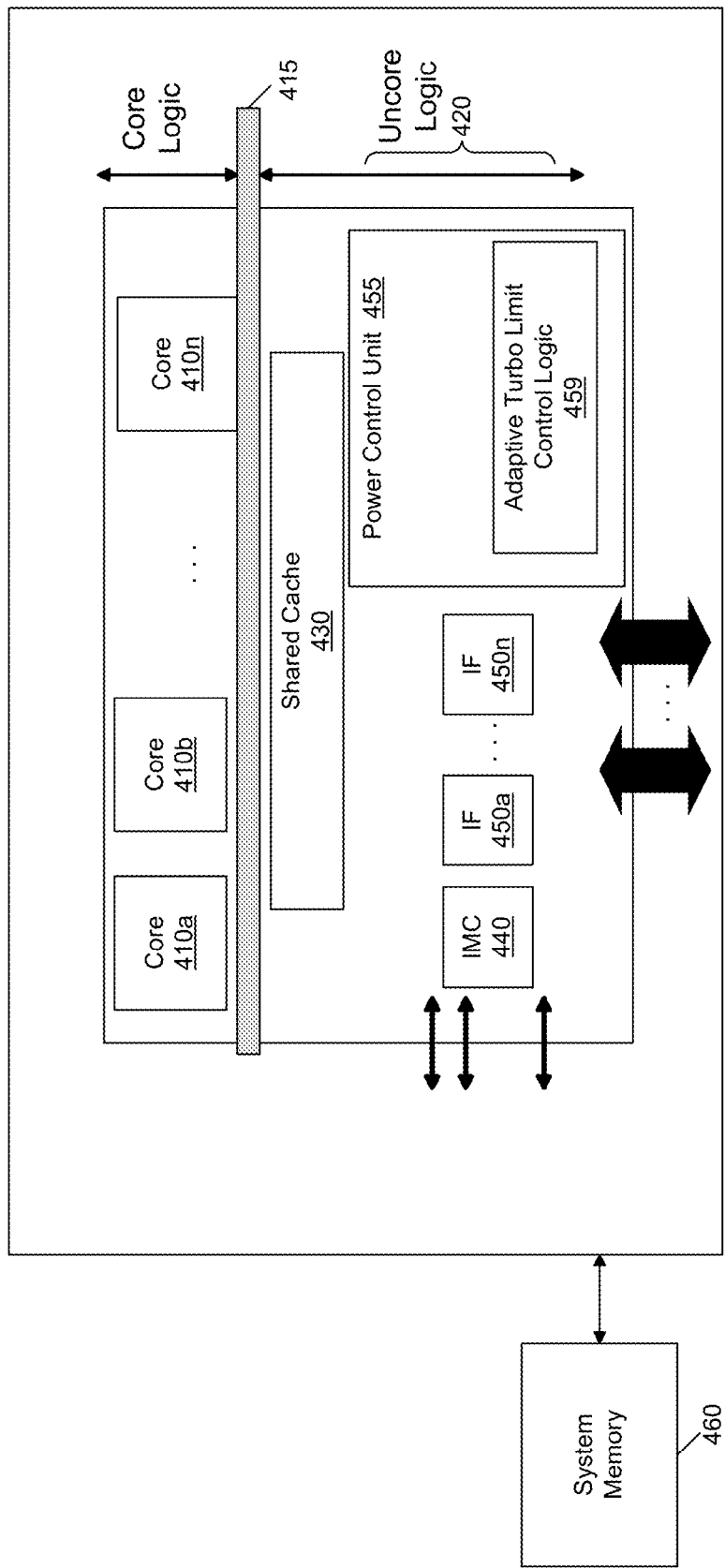
FIG. 5 is a block diagram of a processor in accordance with an embodiment of the present invention.

Embodiments can be implemented in processors for various markets including server processors, desktop processors, mobile processors and so forth. Referring now to FIG. 5, shown is a block diagram of a processor in accordance with an embodiment of the present invention. As shown in FIG. 5, processor 400 may be a multicore processor including a plurality of cores $410_a$-$410_n$. In one embodiment, each such core may be of an independent power domain and can be configured to enter and exit active states and/or maximum performance states based on workload. The various cores may be coupled via an interconnect 415 to a system agent or uncore 420 that includes various components. As seen, the uncore 420 may include a shared cache 430 which may be a last level cache. In addition, the uncore may include an integrated memory controller 440, various interfaces 450 and a power control unit 455. In various embodiments, power control unit 455 may include an adaptive turbo limit control logic 459 in accordance with an embodiment of the present invention. Using this logic, the number of forced transitions can be analyzed and an adaptive maximum ceiling frequency for the cores (and possibly other agents) of the processor may be controlled based as least in part thereon.

With further reference to FIG. 5, processor 400 may communicate with a system memory 460, e.g., via a memory bus. In addition, by interfaces 450, connection can be made to various off-chip components such as peripheral devices, mass storage and so forth. While shown with this particular implementation in the embodiment of FIG. 5, the scope of the present invention is not limited in this regard.

Figure 6:
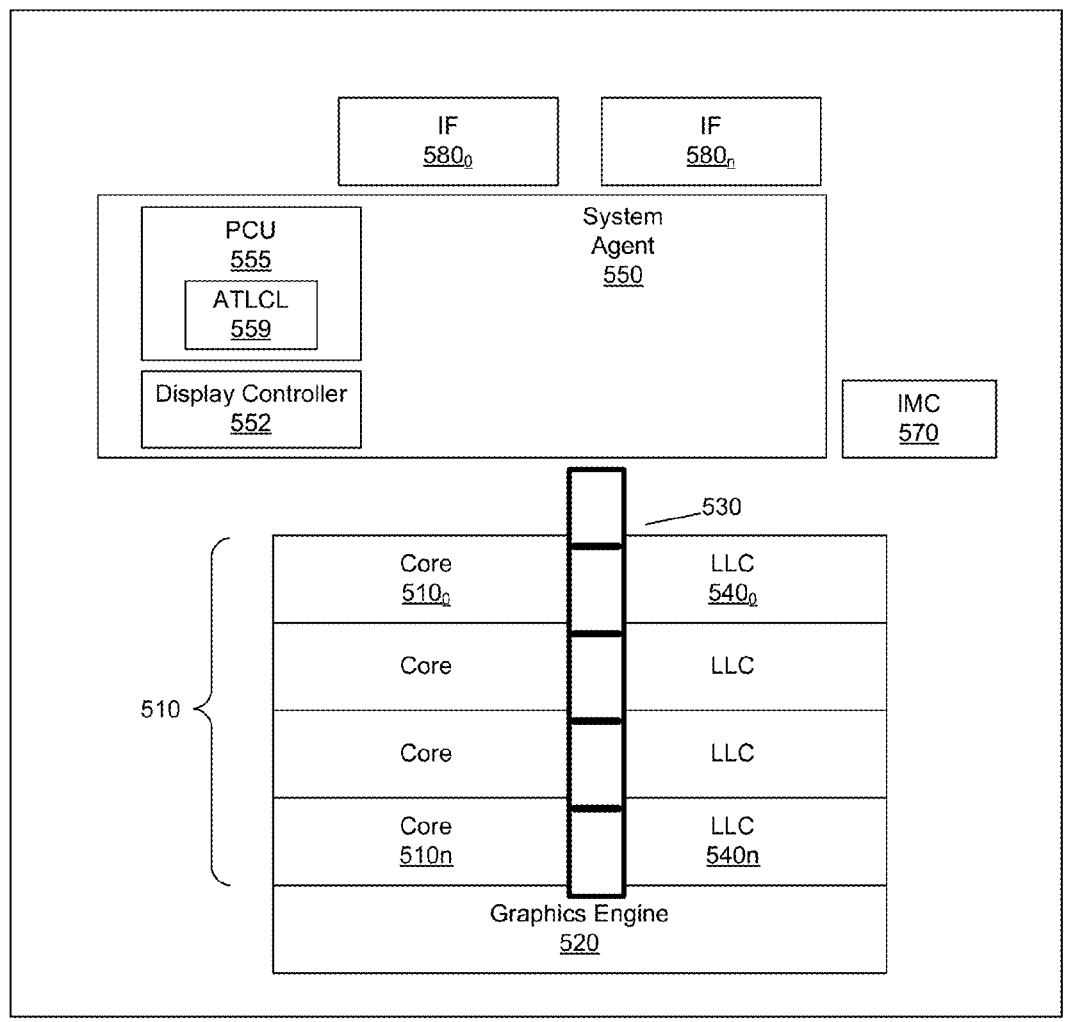
FIG. 6 is a block diagram of a multi-domain processor in accordance with another embodiment of the present invention.

Referring now to FIG. 6, shown is a block diagram of a multi-domain processor in accordance with another embodiment of the present invention. As shown in the embodiment of FIG. 6, processor 500 includes multiple domains. Specifically, a core domain 510 can include a plurality of cores $510_0$-$510_n$, a graphics domain 520 can include one or more graphics engines, and a system agent domain 550 may further be present. In some embodiments, system agent domain 550 may execute at an independent frequency than the core domain and may remain powered on at all times to handle power control events and power management such that domains 510 and 520 can be controlled to dynamically enter into and exit high power and low power states. Each of domains 510 and 520 may operate at different voltage and/or power. Note that while only shown with three domains, understand the scope of the present invention is not limited in this regard and additional domains can be present in other embodiments. For example, multiple core domains may be present each including at least one core.

In general, each core 510 may further include low level caches in addition to various execution units and additional processing elements. In turn, the various cores may be coupled to each other and to a shared cache memory formed of a plurality of units of a last level cache (LLC) $540_0$-$540_n$. In various embodiments, LLC 540 may be shared amongst the cores and the graphics engine, as well as various media processing circuitry. As seen, a ring interconnect 530 thus couples the cores together, and provides interconnection between the cores, graphics domain 520 and system agent circuitry 550. In one embodiment, interconnect 530 can be part of the core domain. However in other embodiments the ring interconnect can be of its own domain.

As further seen, system agent domain 550 may include display controller 552 which may provide control of and an interface to an associated display. As further seen, system agent domain 550 may include a power control unit 555 which can include an adaptive turbo limit control logic 559 in accordance with an embodiment of the present invention to dynamically limit a maximum turbo mode frequency of one or more cores to reduce unwanted or forced, performance state transitions. In various embodiments, this logic may execute the algorithms described above in FIGS. 2 and 3.

As further seen in FIG. 6, processor 500 can further include an integrated memory controller (IMC) 570 that can provide for an interface to a system memory, such as a dynamic random access memory (DRAM). Multiple interfaces $580_0$-$580_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with an Intel® Quick Path Interconnect (QPI) protocol may also be provided. Although shown at this high level in the embodiment of FIG. 7, understand the scope of the present invention is not limited in this regard.

Figure 7:
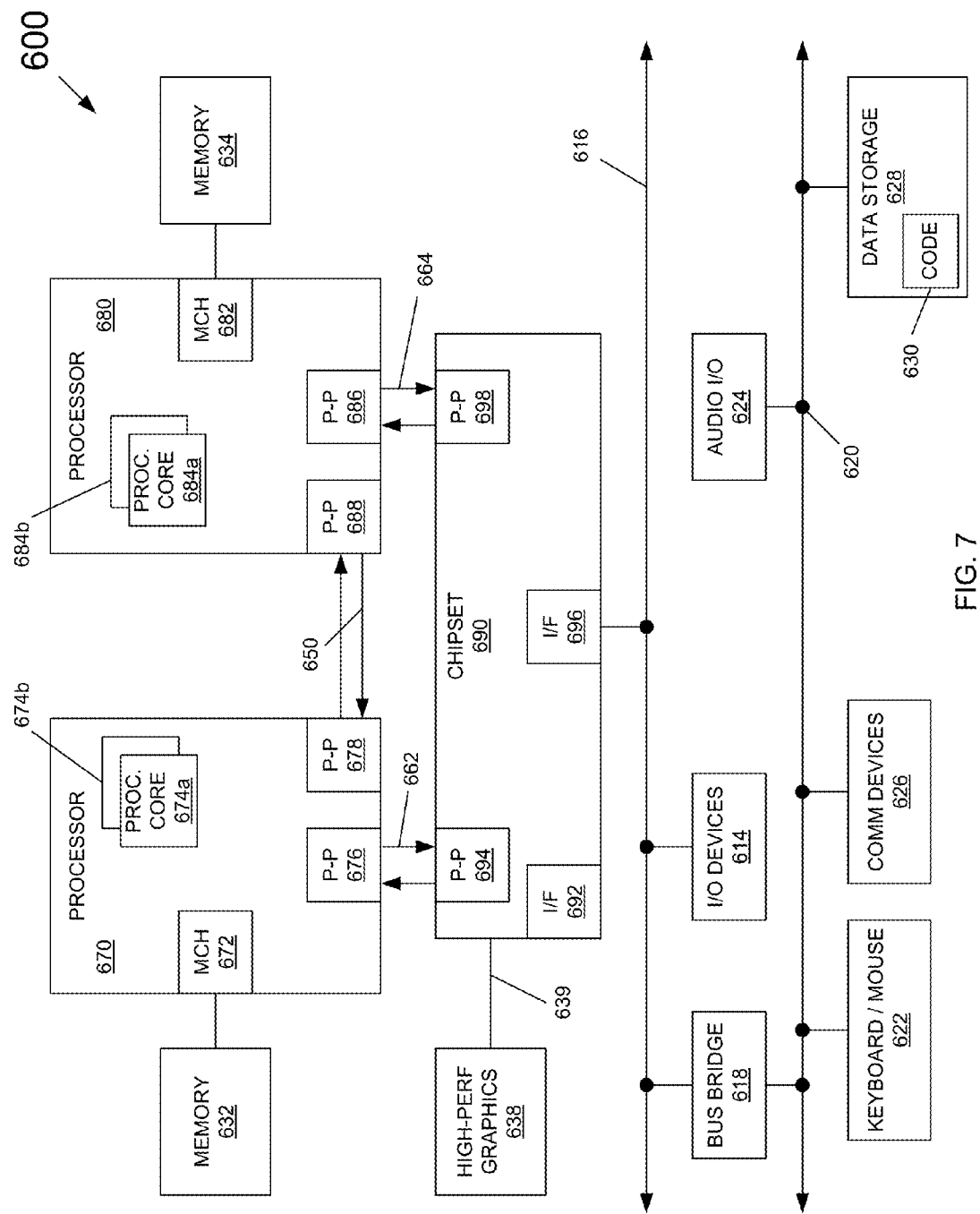
FIG. 7 is a block diagram of a system in accordance with an embodiment of the present invention.

Embodiments may be implemented in many different system types. Referring now to FIG. 7, shown is a block diagram of a system in accordance with an embodiment of the present invention. As shown in FIG. 7, multiprocessor system 600 is a point-to-point interconnect system, and includes a first processor 670 and a second processor 680 coupled via a point-to-point interconnect 650. As shown in FIG. 7, each of processors 670 and 680 may be multicore processors, including first and second processor cores (i.e., processor cores 674a and 674b and processor cores 684a and 684b), although potentially many more cores may be present in the processors. Each of the processors can include a PCU or other logic to reduce undesired performance state transitions while at the same time improving performance, as described herein.

Still referring to FIG. 7, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 7, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 662 and 664, respectively. As shown in FIG. 7, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 7, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Embodiments can be incorporated into other types of systems including mobile devices such as a smart cellular telephone, tablet computer, netbook, Ultrabook™, or so forth.

The following examples pertain to further embodiments.

In one example, a processor includes a plurality of cores each to independently execute instructions and a PCU coupled to the plurality of cores to control power consumption of the processor. The PCU includes an adaptive turbo mode limit control logic to limit a turbo mode frequency of at least one of the plurality of cores to be below a configured maximum turbo mode frequency based at least in part on a number of performance state transitions occurring to the least one core due to low power state exits of others of the plurality of cores.

In an embodiment, the adaptive turbo mode limit control logic is to update the number of performance state transitions when the PCU causes the at least one core to incur a performance state transition when a second core exits a low power state. The adaptive turbo mode limit control logic may limit the turbo mode frequency when the number of performance state transitions exceeds a first threshold, responsive to the second core low power state exit.

In an embodiment, the processor further includes a first storage to store the configured maximum turbo mode frequency, a second storage to store a table including a plurality of entries each associating a number of active cores with a maximum turbo mode frequency.

In an embodiment, the adaptive turbo mode limit control logic is to limit the turbo mode frequency to further be below a maximum turbo mode frequency obtained from one of the plurality of entries of the table. A third storage may store a maximum ceiling frequency corresponding to the turbo mode frequency limit.

Note that the above processor can be implemented using various means.

In an example, the processor comprises a system on a chip (SoC) incorporated in a user equipment touch-enabled device.

In another example, a system comprises a display and a memory, and includes the processor of one or more of the above examples.

In another example, a method includes: determining whether a performance state transition occurs for a first core of a multicore processor when another core of the multicore processor exits a low power state; responsive to the performance state transition, updating a forced transition count; determining whether the forced transition count exceeds a first threshold; and if so, reducing a maximum ceiling frequency value corresponding to a maximum turbo mode frequency at which the first core is to operate.

In an embodiment, the method further includes determining whether the performance state transition occurs responsive to the another core exiting the low power state, and reducing the maximum ceiling frequency value to be less than a configured maximum turbo mode frequency value and a maximum turbo mode frequency obtained from one of a plurality of entries of a table. In an embodiment, the method further includes determining if the forced transition count exceeds a second threshold and if so, reducing the maximum ceiling frequency value.

In an embodiment, an apparatus comprises means to perform a method as in any of the above examples.

In another embodiment, a machine-readable storage medium includes machine-readable instructions, that when executed, implement a method as in any of the above examples.

In another example, a system includes a multicore processor having a plurality of cores each to independently execute instructions and a PCU coupled to the plurality of cores to control power consumption of the multicore processor. The PCU includes a control logic to reduce a maximum operating frequency of the multicore processor if a first number of forced performance state transitions occurs in a first time period or a second number of forced performance state transitions occurs in a second time period. A power supply unit is coupled to the multicore processor to provide a regulated voltage to the multicore processor, and a dynamic random access memory (DRAM) is coupled to the multicore processor.

In an embodiment, the control logic is to compare the first number of forced performance state transitions to a first threshold and to reduce the maximum operating frequency based on the comparison, responsive to a low power state exit of a first core of the plurality of cores. And, the control logic is to compare the second number of forced performance state transitions to a second threshold and to reduce the maximum operating frequency based on comparison, responsive to expiration of a time duration, where the second threshold is less than the first threshold.

In an embodiment, the control logic is to increase the maximum operating frequency if the second number of forced performance state transitions is less than the second threshold and a duration since a prior maximum operating frequency reduction exceeds a third threshold, and to reduce the maximum operating frequency below a configured maximum operating frequency and below a permissible maximum operating frequency based on a number of active cores of the multicore processor.

Understand that various combinations of the above examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a plurality of cores each to independently execute instructions; and
a power control unit (PCU) coupled to the plurality of cores to control power consumption of the processor, the PCU including a control logic to limit a turbo mode frequency of at least one of the plurality of cores to be below a configured maximum turbo mode frequency based at least in part on a number of performance state transitions occurring to the at least one core due to low power state exits of others of the plurality of cores.

2. The processor of claim 1, wherein the control logic is to update the number of performance state transitions when the PCU causes the at least one core to incur a performance state transition when a second core exits a low power state.

3. The processor of claim 2, wherein the control logic is to limit the turbo mode frequency when the number of performance state transitions exceeds a first threshold, responsive to the second core low power state exit.

4. The processor of claim 1, further comprising a first storage of the processor to store the configured maximum turbo mode frequency.

5. The processor of claim 4, further comprising a second storage of the processor to store a table including a plurality of entries each associating a number of active cores with a maximum turbo mode frequency.

6. The processor of claim 5, wherein the control logic is to limit the turbo mode frequency to further be below a maximum turbo mode frequency obtained from one of the plurality of entries of the table.

7. The processor of claim 5, further comprising a third storage to store a maximum ceiling frequency corresponding to the turbo mode frequency limit.

8. A non-transitory machine-readable medium having stored thereon instructions, which if performed by a machine cause the machine to perform a method comprising:
determining whether a performance state transition occurs for a first core of a multicore processor when another core of the multicore processor exits a low power state;
responsive to the performance state transition, updating a forced transition count;
determining whether the forced transition count exceeds a first threshold; and
if so, reducing a maximum ceiling frequency value corresponding to a maximum turbo mode frequency at which the first core is to operate.

9. The non-transitory machine-readable medium of claim 8, wherein the method further comprises determining whether the performance state transition occurs responsive to the another core exiting the low power state.

10. The non-transitory machine-readable medium of claim 8, wherein the method further comprises reducing the maximum ceiling frequency value to be less than a configured maximum turbo mode frequency value and a maximum turbo mode frequency obtained from one of a plurality of entries of a table.

11. The non-transitory machine-readable medium of claim 8, wherein the method further comprises: determining if the forced transition count exceeds a second threshold; and if so, reducing the maximum ceiling frequency value.

12. The non-transitory machine-readable medium of claim 11, wherein the second threshold is less than the first threshold.

13. The non-transitory machine-readable medium of claim 11, wherein the method further comprises increasing the maximum ceiling frequency value if the forced transition count is less than the second threshold.

14. The non-transitory machine-readable medium of claim 13, wherein the method further comprises increasing the maximum ceiling frequency value further when a duration since a prior maximum ceiling frequency value reduction exceeds a third threshold.

15. A system comprising:
a multicore processor comprising:
a plurality of cores each to independently execute instructions; and
a power control unit (PCU) coupled to the plurality of cores to control power consumption of the multicore processor, the PCU including a control logic to reduce a maximum operating frequency of the multicore processor if a first number of forced performance state transitions occurs in a first time period or a second number of forced performance state transitions occurs in a second time period;

a power supply unit coupled to the multicore processor to provide a regulated voltage to the multicore processor; and a dynamic random access memory (DRAM) coupled to the multicore processor.

16. The system of claim 15, wherein the control logic is to compare the first number of forced performance state transitions to a first threshold and to reduce the maximum operating frequency based on the comparison, responsive to a low power state exit of a first core of the plurality of cores.

17. The system of claim 16, wherein the control logic is to compare the second number of forced performance state transitions to a second threshold and to reduce the maximum operating frequency based on the comparison, responsive to expiration of a time duration, and wherein the second threshold is less than the first threshold.

18. The system of claim 17, wherein the control logic is to increase the maximum operating frequency if the second number of forced performance state transitions is less than the second threshold and a duration since a prior maximum operating frequency reduction exceeds a third threshold.

19. The system of claim 15, wherein the control logic is to reduce the maximum operating frequency below a configured maximum operating frequency and below a permissible maximum operating frequency based on a number of active cores of the multicore processor.

20. The system of claim 19, further comprising a first storage to store the configured maximum operating frequency, a second storage to store a table including a plurality of entries each associating a number of active cores with the permissible maximum operating frequency, and a third storage to store the reduced maximum operating frequency.

* * * * *